Sept. 27, 1932. J. LE R. DODSON Re. 18,608

IGNITION SWITCH

Original Filed March 17, 1927

INVENTOR.
JAMES L. DODSON.

BY
Lockwood Lockwood Goldsmith & Gall
ATTORNEYS.

Reissued Sept. 27, 1932

Re. 18,608

UNITED STATES PATENT OFFICE

JAMES LE ROY DODSON, OF CHICAGO, ILLINOIS

IGNITION SWITCH

Original No. 1,748,705, dated February 25, 1930, Serial No. 175,976, filed March 17, 1927. Application for reissue filed December 31, 1931. Serial No. 584,235.

This invention relates to an automatic control for vehicles.

The chief object of this invention is to provide a device for automatically stopping the motor of an automobile when the driver leaves the driver's seat thereby preventing excessive fuel cost.

Another object of the invention is to permit the motor to be started while the driver is not on the driver's seat but which permissive control is automatically returned to an inoperative or non-permissive position by the driver sitting on the driver's seat which also simultaneously therewith permits motor operation through the usual control.

The chief feature of the invention consists in the provision of a seat actuated ignition switch with a shunt connected switch independently operable for circuit closing and automatically operable for circuit opening upon the closing of the first mentioned switch.

Figure 1:
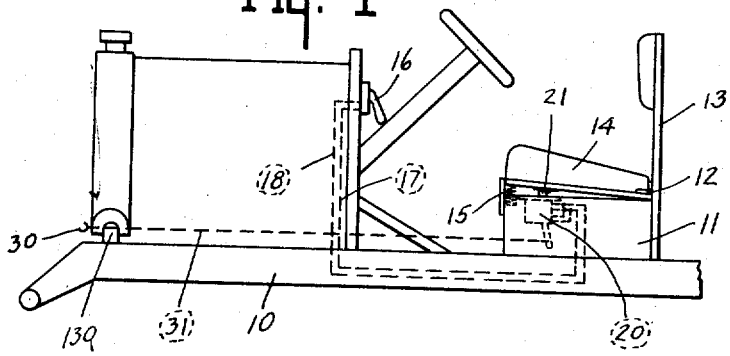
Figure 2:
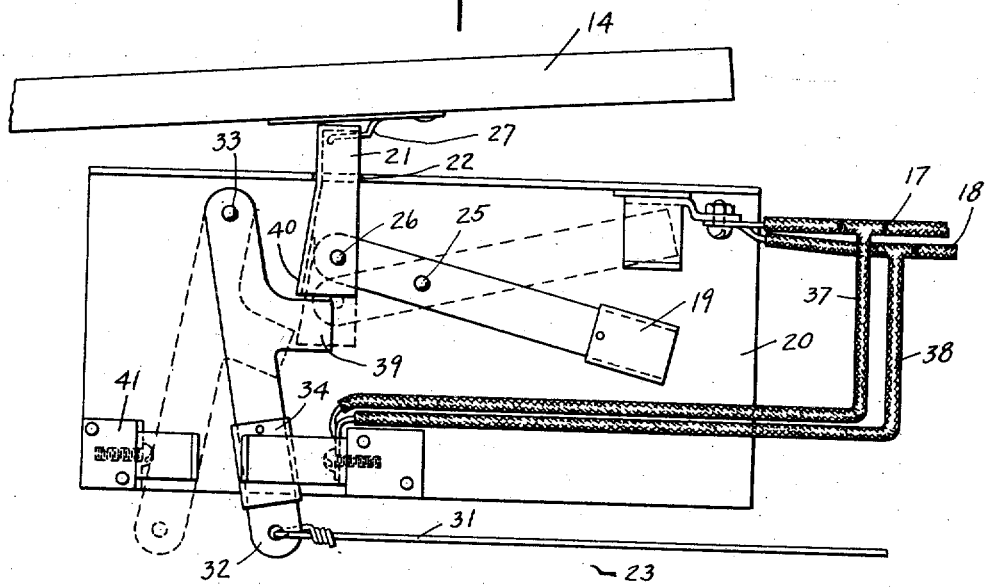
Figure 3:
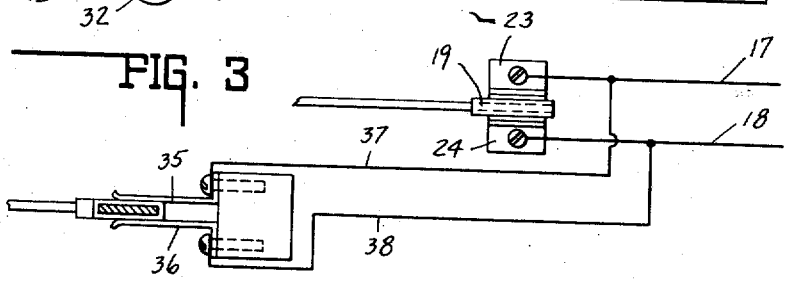

The full nature of the invention will be understood from the accompanying drawing and the following description and claims:

Fig. 1 is a side elevational view of the lower portion of the self-propelled vehicle including the invention, the same being shown semi-diagrammatic. Fig. 2 is an enlarged elevational view of the major portion of the invention. Fig. 3 is a wiring diagram of the switch connection.

In the drawing 10 indicates a chassis supporting an engine not shown and a driver's seat support 11. Hingedly supported at 12 thereon or upon the back 13 is a driver's seat 14 and normally maintaining said driver's seat in the slightly elevated position in a spring or springs 15. The engine is controlled by the usual ignition switch 16 and the usual ignition circuit is opened between said switch and the engine and lines 17 and 18 constitute extensions of the opening in the circuit and are closed by a switch member 19 carried by the movable member 21, in turn supported by and movable with the seat 14 at 27. One form of switch construction comprises a casing 20, a knife switch blade 19 and an actuating member 21, the latter being slidably mounted in aperture 22 in said casing. Member 19 is adapted to close the circuit between contacts 23 and 24 connected respectively to lines 17 and 18, thereby closing a circuit therethrough. The switch member 19 is pivotally mounted at 25 and is pivotally connected at 26 to the actuating member 21. The actuating member 21 is substantially channel-shaped with a closed end and is detachably connected to the seat 14 by the tongue clamp 27.

When the driver is seated, seat 14 is tilted downwardly in opposition to spring 15 and the member 19 is tilted into the dotted line position, see Fig. 2, for closing the circuit across the contacts 23 and 24 thereby completing the circuit across the gap in the ignition system between the main ignition switch 16 and the engine. When the driver leaves his seat, spring 15 positions the seat in the upper position, as shown in the full lines in Fig. 2. This causes the member 19 to be positioned out of contact with the switch members which opens the ignition circuit to the engine. The result is stoppage of the engine.

The aforesaid construction is particularly of value for trucking purposes, such as routes where stops are made varying from two to three minutes or greater. For example, bread delivery routes have anywhere from 50 to 100 stops, the average being about 65 or 70. It requires anywhere from two to eight or ten minutes to deliver bread and get a receipt or secure payment since the shop-keeper may be otherwise engaged with customers. With 60 stops and a three minute wait at each place normally the engine would idle three hours during an eight or ten hour day. Since the trucks are generally used in the day time considerable economy is obtained by automatically cutting off the engine when the stop is made and starting the engine when the driver is ready to proceed on his route for the batteries will be kept charged since but little night driving is required.

As an auxiliary for those trucks that are not provided with an automatic starter driven by a storage battery for permitting the motor to be cranked, or upon failure of the storage battery for starting from the usual hand crank construction, an additional control is provided. The same consists of a finger piece 30 connected to the forward end of a wire or chain 31 supported at 130 while the rear end thereof is connected to a lever arm 32 pivotally mounted at 33 in the casing 20. Lever 32 carries a contact member 34 which, when the rod or wire 31 is pulled, closes the circuit across the contacts 35 and 36 connected by lines 37 and 38 to lines 17 and 18, respectively. The result is that with the ignition switch 16 turned on, the ignition circuit will be closed through the same to the motor since the wire 31 is pulled out and the lever 32 is positioned as shown by the full lines in Fig. 2. Lever 32 carries an abutment 39 and member 21 has an agular extension or cooperating portion 40 which, when the seat 14 is depressed, engages abutment 39 and cams the same from the full line position to the dotted line position, thus returning the lever 32 to the open circuit position. Just prior to the breaking of the circuit across the contacts 35 and 36, the circuit is closed across the contacts 23 and 24 so that operation of the engine is not affected by the opening of one branch circuit and the closing of the other branch circuit. The adjustable member 41 adjusts the initial or open circuit position of the lever 32 sufficient to permit the clearance of the abutment 39 and the shape of the portion 40 is such that upon return movement of the seat by reason of the driver leaving the same, the portion 40 serves as an over-running cam and does not return lever 32 to the closed circuit position.

The invention claimed is:

1. In a motor vehicle including an internal combustion engine, a control therefor, a movably mounted driver's seat movable by the seating of the driver thereon, the combination of a control mechanism automatically operable by the movement of the seat for actuating the control for controlling the engine, and an auxiliary control of the engine extending toward and terminating adjacent the crank portion of the engine and manually operable for rendering ineffective the control imposed by the seat controlled mechanism.

2. In a motor vehicle including an internal combustion engine, a control therefor, a movably mounted driver's seat movable by the seating of the driver thereon, the combination of a control mechanism automatically operable by the movement of the seat for actuating the control for controlling the engine, and an auxiliary control of the engine extending toward and terminating adjacent the crank portion of the engine and manually operable for rendering ineffective the control imposed by the seat controlled mechanism, said seat control and said auxiliary control having mutual cooperation whereby the seat controlled mechanism automatically returns the auxiliary control to the inoperative position upon actuation of the seat controlled mechanism into operative position.

3. In a motor vehicle including an internal combustion engine, a control adapted to stop said engine, a movable driver's seat automatically changing its position when vacated by the driver and by said change of position actuating said control to stop the engine, and an auxiliary control adapted to control the starting of the engine when the engine has been stopped by the control first named, said auxiliary control having means through which it is voluntarily actuated, presented for manipulation at and accessible to the driver only when the driver is in a position remote from said seat, said seat also having movement upon occupancy by the driver and having connections through which, by its last named movement, it displaces said auxiliary control without interrupting the running of the engine.

4. In a motor vehicle including an internal combustion engine, a control including a switch adapted to stop said engine, a movable driver's seat automatically changing its position when vacated by the driver and by said change of position actuating said control to stop the engine by opening the switch, an auxiliary control including a switch in shunt with the first mentioned switch and adapted to control the starting of the engine when the engine has been stopped by the control first mentioned, said auxiliary control having means through which it is voluntarily actuated, and means upon the motor vehicle remote from the seat and supporting the voluntarily actuable means of said auxiliary control whereby the voluntarily actuable means is accessible to the driver for manipulation to close the shunt switch to start the engine only when the driver is in a position remote from said seat, said shunt switch being automatically opened when the driver's seat is moved to close the first mentioned switch.

5. In a motor vehicle including the combination with an internal combustion engine, an ignition circuit for the engine, and a movable driver's seat automatically changing its position when vacated by the driver, of switch means interposed in the ignition circuit and including a pair of movable switch members, an auxiliary control adapted to control the starting of the engine when the engine has been stopped and the driver is off the seat and by moving one of said switch members, said auxiliary control being voluntarily actuated and terminating in an exposed operating portion remote from the seat, another control operatively associated with the other of said switch members for closing said switch member to close the ignition circuit when the driver is on said seat, and a cooperative cam connection between said switch members for automatically returning the first mentioned switch member to open circuit position when the second mentioned switch member is moved to closed circuit position, the second mentioned switch member being automatically movable to open circuit position when the driver leaves the seat.

6. A device as defined by claim 5, characterized by the switch means and cooperating cam connection comprising a unit, said controls being operatively associated therewith, and said driver's seat operable control including a reciprocable portion.

In witness whereof, I have hereunto affixed my signature this 10th day of November, 1931.

JAMES LE ROY DODSON.